Nov. 23, 1926.  
A. F. RAYMOND  
1,608,337  
TWO-HEAD ROTATABLE FASTENING DEVICE  
Original Filed May 28, 1923
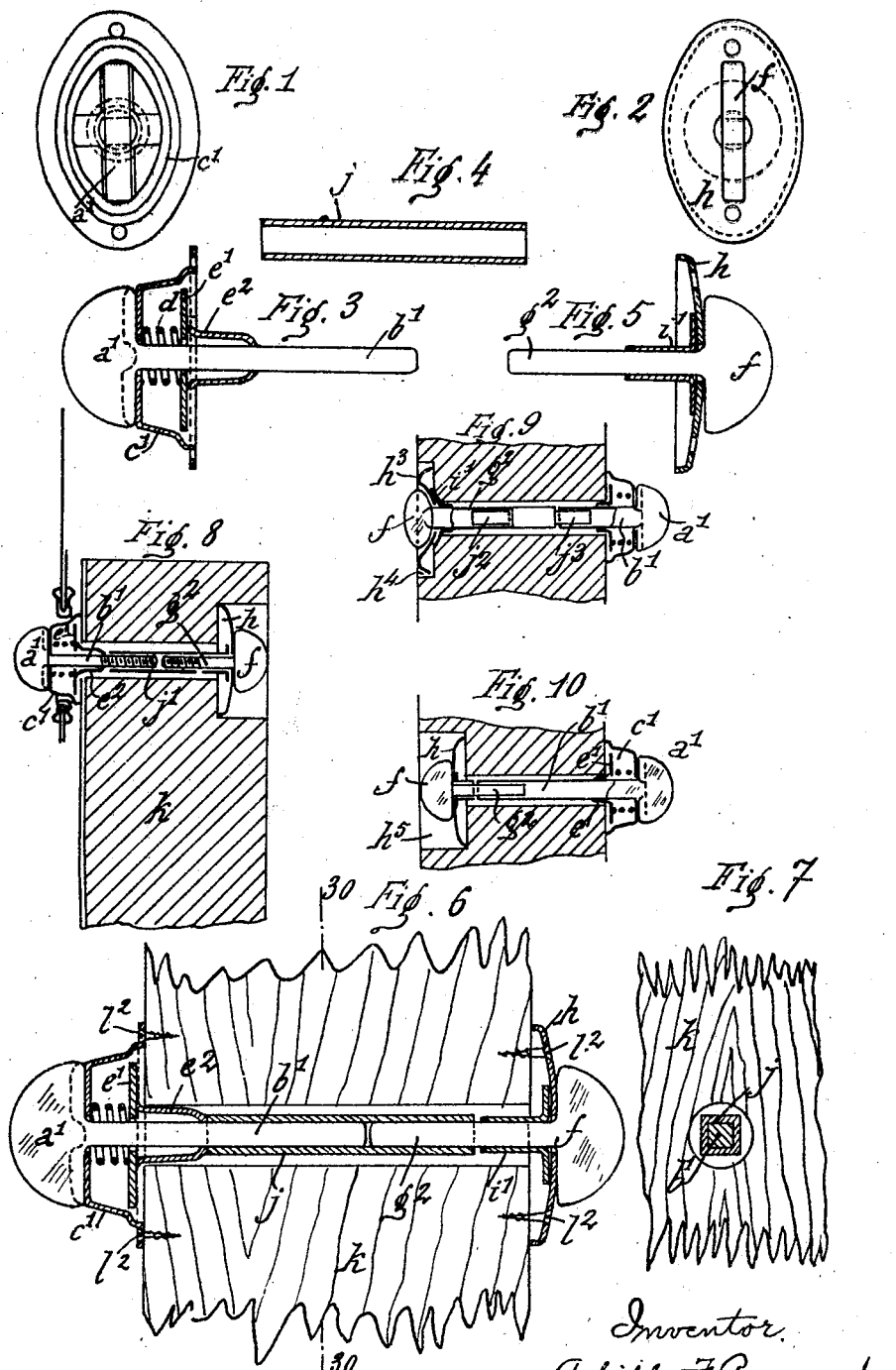

Patented Nov. 23, 1926.

1,608,337

UNITED STATES PATENT OFFICE.

ACHILLE FRANÇOIS RAYMOND, OF GRENOBLE, FRANCE.

TWO-HEAD ROTATABLE FASTENING DEVICE.

Original application filed May 28, 1923, Serial No. 642,010, and in France February 28, 1923. Divided and this application filed October 2, 1924. Serial No. 741,290.

The present invention has for its object an arrangement of this two head fastener so devised as to allow of securing a flexible fabric to a wall having a substantial thickness, such as a hood to be secured to the body of a motor car without the necessity of riveting the second head of the fastener to the first one at the time when the fastener is fixed to the car.

According to the invention, the rotatable fastener is composed of a first head the shank of which passes through the body of the rotatable part (which comprises internally a coil spring or leaf) and is so mounted as to be able to revolve without being capable however of coming out of the latter, and of a second head passing through a socket of oval shape or any other shape, which is adapted to be secured to the other side of the wall and in which the second head can revolve without being capable of coming out, the connection of the shanks which are an extension of the fastener heads being effected in any suitable manner, such as sleeving on, threading, pinning and the like.

The following specification will allow to easily understand the way in which the invention is carried out with reference to the accompanying drawing given by way of example, in which:

Fig. 1 is a plan view of a first head of the rotatable fastener.

Fig. 2 is a plan view of the second head.

Figs. 3, 4 and 5 are longitudinal sections of three parts constituting the fastener according to the present invention.

Fig. 6 shows in longitudinal section a fastener secured to a wooden wall.

Fig. 7 is a section on line 30—30 of Fig. 6.

Figs. 8 to 10 are respectively schematic sections of modified forms of construction of the rotatable fastener.

As shown in Figures 3 to 5, the fastener made according to the invention comprises:

1. A first head (Figure 3) $a^1$ the shank $b^1$ of which traverses the body $c^1$ of the fastener, in which it can freely turn and extends on a certain length beyond this body $c^1$ while preserving its square section. A spring $d$ is provided in the usual manner, within the body $c^1$ of the fastener so as to press the head $a^1$ against the body $c^1$. The shank $b^1$ is yieldingly maintained in the body $c^1$ through a sort of collar $e^2$ connected with the shank $b^1$ and bearing against the bottom plate $e^1$ of the rotatable fastener, the said plate acting as a bearing for the spring $d$; this plate $e^1$ is somewhat loose within the body of the fastener so as to be capable of slightly sliding in following the movement of the key head which moves up and down in its rotary motion when passing the notches or depressions 11 of the fastener body that latch the fastener in the customary two positions 90° apart and strains or relaxes the coil spring which is confined between the bottom of the fixed body $c^1$ of the fastener and the plate $e^1$.

2. A second fastener head (Figure 5) which has in the drawing the form of a key $f$ but which could be replaced by a more or less flattened oval stud or button or by a loop. A square shank $g^2$ connected with the head $f$, traverses a socket $h$ of oval or other shape which is used for fixing the head to the wall, a collar or washer $i^1$ is connected with the shank $g^2$, that is to say is soldered, pinned or riveted to the shank. This collar $i^1$ could moreover be replaced by lugs cut from the shank. This arrangement allows the shank $g^2$ to rotate in the socket $h$ while preventing the same from coming out therefrom. The socket $h$, as shown in Fig. 2 is of oval shape. This shape is preferably adopted because it enables one to find out the position of the key corresponding to the opening or closing of the fastener, more conveniently than any other shape, but of course any other form could be eventually preferred.

3. A tube $j$ (Figure 4) having an internal section capable of insuring a driving action, such as a square, rectangular, oval or polygonal section and which is preferably longer than the longest of the shanks $b^1$, $g^2$ and which can be applied upon the latter so as to connect them together.

The securing of the rotable fastener is effected in the same manner in case the same is used in connection with a motor car.

In the wall $k$ (Fig. 6.) of the car body is drilled a hole, of cylindrical form for example, whose diameter (Fig. 7) is greater than the diagonal of the tube $j$ so that the latter can freely turn in this hole. The body $c^1$ of the first head of the rotatable fastener is secured to the face of the wall $k$ which is adapted to receive the hood by means of screws $l^2$, or nails, claws or any other means. The shank $g^2$ of the second key is then introduced into the tube $j$ and the whole is engaged into the hole drilled in the car body so that the shank $b^1$ will enter the tube $j$; the two keys are then connected together and the socket $h$ is secured by any suitable means to the second face of the car body $k$. The collar $e^2$ being secured to the shank $b^1$ prevents axial disengagement of the shank and the tube $j$.

By introducing the tube $j$ upon the shank $b^1$, care must be taken so that the head $f$ be in the same place as the head $a^1$ so that the positions of the two heads will be the same when opening or when closing and so that the movement of the keys, either from outside or from inside, cannot be confused.

The free length of the ends of the shanks $b^1$ and $g^2$ are such than when a certain portion of length of the tube $j$ is added thereto, they will correspond to the normal thickness of the car body, but it is obvious that they can be of any required sizes and that particularly in the case of thick car-bodies, the shanks are made of a greater length and of a greater thickness so as to offer a sufficient resistance to the torsion of metal.

The securing of the fastener to a wooden wall has just been described, but it must be understood that it could be secured to any kind of material, such as metal, plastic matters, and the like.

If it is desired that the key $f$, which generally points towards the interior of the car body, not project from the latter, the socket $h$ can be made of a hollow form $h^3$ as shown in Figure 9, and this socket can be fixed in a recess $h^4$ provided in said car body, so as to constitute a seat for the head $f$, which, as shown in Fig. 9, is now but slightly projecting.

The head $f$ can also be entirely concealed within the recess $h^5$, as shown in Figures 8 and 10.

The way of connecting together the shanks of the two keys of the rotatable fastener is capable of numerous alterations. For example, as shown in Figure 8, these cylindrical shanks could be threaded and screwed tightly within a tube $j^1$ which is internally threaded. In the same way, the shank $b^1$ can be hollow (Fig. 10) and can receive at its end the shank $g^2$ which construction permits the omission of the tube $j$.

Finally, this tube $j$ could still be provided at its two ends with portions $j^2$, $j^3$, of a square section, which would enter into the shanks $b^1$ and $g^2$ of tubular form with a square section (Figure 9).

The tube $j$ may be flush with the interior of the car body at the side where the second head $f$ lies, said second head being then secured to the tube $j$ by means of pins, or the like.

In all the figures the collar $e^2$ on shank $b^1$ and the collar $i^1$ on the shank $g^2$ prevent the axial disengagement of the respective shanks from their connecting member.

Detail alterations may be made to the present invention without departing from its principle.

What I claim is:

1. A rotatable fastener comprising a body, a shank yieldingly mounted in the body, a head on the shank, a second separate shank, a second head carried by the second shank, and means for connecting the two shanks.

2. A rotatable fastener comprising a body, a shank yieldingly mounted in the body, a head on the shank, a second separate shank, a second head carried by the second shank, and a sleeve for connecting the two shanks, said shanks and sleeve being of a non-circular section.

3. A rotatable fastener comprising a body serving as male portion, a shank disposed within said body, a head secured to the said shank, means for holding the said head in two positions at right angles to each other, means for securing the male portion to the wall, a second head disposed on the other side of the said wall, a shank secured to this second head, means providing a substantial connection between the two shanks of the two heads whereby the shanks thus connected may be turned together by acting upon either of the heads.

4. A rotatable fastener comprising a body serving as a male portion, a shank disposed within the said body, a head secured to the said shank, means for securing the said body forming the male portion to a thick wall, means for holding the head and shank in two 90° positions, a second head mounted on a second shank disposed on the other side of the wall to which the fastener is to be secured, means for holding the second head against sliding upon the said wall and means for connecting together the two shanks of the two heads.

5. A rotatable fastener comprising a body serving as a male portion, a head secured to a shank having a polygonal cross section, means for preventing the said head from sliding and for holding it in two given fixed positions upon its rotation, means for securing the said body forming the male portion to a wall, a second head mounted on a shank having a polygonal cross section and situated on the other side of the wall, a socket, also situated on the other side of the wall and so disposed that the second head shall be rotatable but not slidable, with reference to the socket, and a hollow tube fitted upon both of the said shanks which are secured to the said heads, said tube connecting the shanks together.

In testimony that I claim the foregoing as my invention, I have signed my name.

ACHILLE FRANÇOIS RAYMOND.